United States Patent
Sturniolo et al.

(10) Patent No.: US 9,565,230 B2
(45) Date of Patent: Feb. 7, 2017

(54) SYSTEM AND METHOD OF ENCRYPTED MEDIA ENCAPSULATION

(75) Inventors: Emil Sturniolo, Medina, OH (US); Anthony Fascenda, Rockville, MD (US); Robert Cichielo, Asbury, NJ (US); Paul Benware, Mendon, NY (US); William Supernor, Dunn Loring, VA (US); Orville Pike, Annapolis, MD (US)

(73) Assignee: KOOLSPAN, INC., Bethesda, MD (US)

( * ) Notice: Subject to any disclaimer, the term of this patent is extended or adjusted under 35 U.S.C. 154(b) by 160 days.

(21) Appl. No.: 12/860,205

(22) Filed: Aug. 20, 2010

(65) Prior Publication Data

US 2011/0044453 A1 Feb. 24, 2011

Related U.S. Application Data

(60) Provisional application No. 61/235,515, filed on Aug. 20, 2009.

(51) Int. Cl.
| | |
|---|---|
| *H04K 1/00* | (2006.01) |
| *H04L 29/06* | (2006.01) |
| *G10L 19/00* | (2013.01) |

(52) U.S. Cl.
CPC ............ *H04L 65/607* (2013.01); *G10L 19/00* (2013.01); *H04K 1/00* (2013.01); *H04L 63/0428* (2013.01)

(58) Field of Classification Search
CPC ........................................................ H04L 9/00
USPC ................................................. 713/153–154
See application file for complete search history.

(56) References Cited

U.S. PATENT DOCUMENTS

| | | | |
|---|---|---|---|
| 6,618,397 B1 * | 9/2003 | Huang | H04L 29/06 370/392 |
| 6,910,133 B1 | 6/2005 | Cohn | |
| 7,325,133 B2 | 1/2008 | Fascenda | |
| 7,389,357 B2 | 6/2008 | Duffie, III et al. | |
| 7,460,671 B1 * | 12/2008 | Rossello | G10L 19/00 380/255 |
| 2002/0154633 A1 * | 10/2002 | Shin | H04L 47/10 370/389 |
| 2003/0063569 A1 | 4/2003 | Kalliokulju et al. | |
| 2003/0235184 A1 * | 12/2003 | Dorenbosch | H04L 29/06 370/352 |
| 2004/0136455 A1 * | 7/2004 | Akhter | H04N 21/4382 375/240 |

(Continued)

OTHER PUBLICATIONS

Jonas et al., "Audio streaming on the Internet. Experiences with real-time streaming of audio streams," Industrial Electronics, 1997. ISIE '97., Proceedings of the IEEE International Symposium on Year: 1997, vol. 1 pp. SS71-SS76.*

Smolenski et al., "Design of a personal digital video recorder/player," M. Smolenski; T. Fink; K. Konstantinides; D. Frankenberger; C. Peplinski Signal Processing Systems, 2000. SiPS 2000. 2000 IEEE Workshop on Year: 2000 pp. 3-12.*

(Continued)

*Primary Examiner* — Roderick Tolentino
(74) *Attorney, Agent, or Firm* — Hunton & Williams LLP

(57) ABSTRACT

A system for and method of media encapsulation is presented. The method may include receiving, via an audio digitizer, a plurality of packets of data and compressing, via a codec, the plurality of packets of data. The method may also include queuing the plurality of packets of data in a queue and encrypting, via a filter, payloads of at least two of the plurality of packets of data in the queue into a single payload. The method further include transmitting the single payload in a single encrypted data packet.

15 Claims, 7 Drawing Sheets

(56) References Cited

U.S. PATENT DOCUMENTS

| | | | |
|---|---|---|---|
| 2004/0221153 A1 | 11/2004 | Kim et al. | |
| 2005/0238050 A1 | 10/2005 | Pung et al. | |
| 2006/0083220 A1* | 4/2006 | Mekala | H04L 12/66 370/352 |
| 2006/0190719 A1 | 8/2006 | Rao et al. | |
| 2008/0062987 A1* | 3/2008 | Elmasry | H04L 63/0428 370/392 |
| 2008/0130864 A1* | 6/2008 | Duree | H04L 12/5602 379/221.14 |
| 2008/0162922 A1* | 7/2008 | Swartz | H04L 63/162 713/150 |
| 2008/0199009 A1* | 8/2008 | Adhikari | G06T 1/0021 380/252 |
| 2009/0034544 A1* | 2/2009 | Butenko | H04M 1/7258 370/401 |
| 2009/0233596 A1* | 9/2009 | Calabrese | H04W 4/18 455/426.1 |

OTHER PUBLICATIONS

Fascenda, U.S. Appl. No. 11/724,153, filed Mar. 15, 2007.
International Search Report for International Application No. PCT/US2010/046155, mailed Oct. 12, 2010.
Written Opinion for International Application No. PCT/US2010/046155, mailed Oct. 12, 2010.
Lars Volker, et al., "Introducing QoS mechanisms into the IPsec packet processing," in Local Computer Networks, 2007, LCN 2007, $32^{nd}$ IEEE Conference on, IEEE, PI, Oct. 1, 2007; 360-367.
Christian Geisler (Examiner), "Extended European Search Report, including the Supplementary European Search Report and the European Search Opinion," dated Jul. 31, 2013, issued from the European Patent Office in European Patent Application No. 10810656.8 (8 pages).
European Patent Office Examination Report, dated Jun. 17, 2015, in corresponding European Application No. 10810656.8.

* cited by examiner

SYSTEM AND METHOD OF ENCRYPTED MEDIA ENCAPSULATION

CROSS-REFERENCE TO RELATED APPLICATIONS

This patent application claims priority to U.S. Provisional patent application No. 61/235,515, filed Aug. 20, 2009, which is hereby incorporated by reference herein in its entirety.

The present application is also related to U.S. Utility patent application Ser. No. 11/951,202 entitled "Secure Mobile Telephony" to Fascenda et al. and filed on Dec. 5, 2007, and U.S. Provisional application No. 60/987,709 entitled "Secure Mobile Telephony" to Fascenda et al. and filed on Nov. 13, 2007, the disclosures of which are hereby incorporated by reference in their entireties.

FIELD OF THE INVENTION

The invention relates generally to the field of encrypting media communications and, in some embodiments, to encrypting audio communicated using Voice over IP (VoIP).

BACKGROUND

VoIP has become more and more popular as various mass-market services have capitalized on the expanding availability of Internet access. VoIP has been implemented in various ways using both proprietary and open protocols and standards. Examples of technologies used to implement VoIP include: H.323; IP Multimedia System (IMS); Session Initiation Protocol (SIP); and, Real-time Transport Protocol (RTP).

RTP is used extensively in VoIP communication and entertainment systems that involve streaming media, such as internet telephony, video teleconference applications, and web-based push-to-talk features. RTP was developed by the Audio-Video Transport Working Group of the Internet Engineering Task Force (IETF) and first published in 1996 as Request for Comments (RFC) 1189. This version was superseded in 2003 by RFC 3550.

While the advent of VoIP using RTP has provided many benefits, one of the drawbacks has been the ease with which third parties can intercept a VoIP transmission and record the conversation. While several standards have been developed for encryption of data flow, such as the Secure Real-time Transport Protocol (SRTP) and Media Path Key Agreement for Secure RTP (ZRTP), some VoIP providers and networks will not process encrypted data without specific knowledge of the SRTP/ZRTP/security protocols, including any potential keying and credential material. SRTP has the facilities to secure and sign the entire RTP payload, instead of just the audio payload. For example, any network infrastructure component or relay server that needs to modify the RTP header information for its own purposes must have knowledge of the session key(s) in order to modify the contents of any signed RTP header information.

Nevertheless, RTP with its associated security protocols, in conjunction with the standard User Datagram Protocol (UDP) and Internet Protocol (IP) encapsulation, exhibit the problem of adding significant overhead in terms of bandwidth consumption to the data transmissions by the parties involved in the communications. While this overhead may be capably handled by many of the newer networks available today, these transmissions may exceed the capacity of some of the existing infrastructure in some of the less-developed or rural/remote areas of the world or where a network connection is made through the use of a wireless wide area network (WWAN).

In addition to the bandwidth consumption problem, there are also service issues when RTP is used in conjunction with UDP. UDP does not guarantee the delivery, sequence, or uniqueness of any RTP payload, thus resulting in the occasional loss of audio packets. Furthermore, information in RTP headers is sometimes modified or changed when transferred among networks and servers and communication of RTP headers is not guaranteed end-to-end.

It would therefore be desirable to be able to reliably encrypt VoIP communications via RTP transmissions while minimizing or reducing the amount of overhead required for secure data transmission of media content.

SUMMARY OF CERTAIN EMBODIMENTS OF THE INVENTION

The present invention provides systems and methods for encrypting audio (e.g., VoIP), visual communications, and other real time data as well as the ability for reducing the overhead required for the data transmission. Aspects of the invention provide a method for organizing RTP packets into a queue, encrypting the payload of a least one of a plurality of queued packets at substantially the same time, and transmitting the encrypted payloads of the packets in a single RTP packet.

Aspects of the invention also provide a system for encrypting audio (e.g., VoIP), visual communications, and other real time data where the system comprises a computer with at least a computer processor that organizes RTP packets into a queue, encrypts the payload for at least one of a plurality of queued packets at substantially the same time, and transmits the plurality of encrypted payloads of the RTP packets in a single RTP packet.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Certain embodiments of the present invention provide systems and methods for encrypting media communications transmitted over VoIP. As used herein, the terms "media" and "data" are interchangeable and mean any audio or visual data.

The term "UDP" means User Datagram Protocol. UDP is defined to make available a datagram mode of packet-switched computer communication in an environment of an interconnected set of computer networks. UDP provides a procedure for application programs to send messages to other programs with a minimum of protocol mechanism. UDP is designed to transport information without the sequencing and guaranteed delivery requirements of the Transmission Control Protocol (TCP). UDP is often used in place of TCP because it is not subject to the same potential delays or overhead as TCP. Because UDP does not have a guaranteed delivery requirement, it occasionally loses a packet of data. For audio transmissions, these losses of data typically go unnoticed by the human ear.

Figure 1:
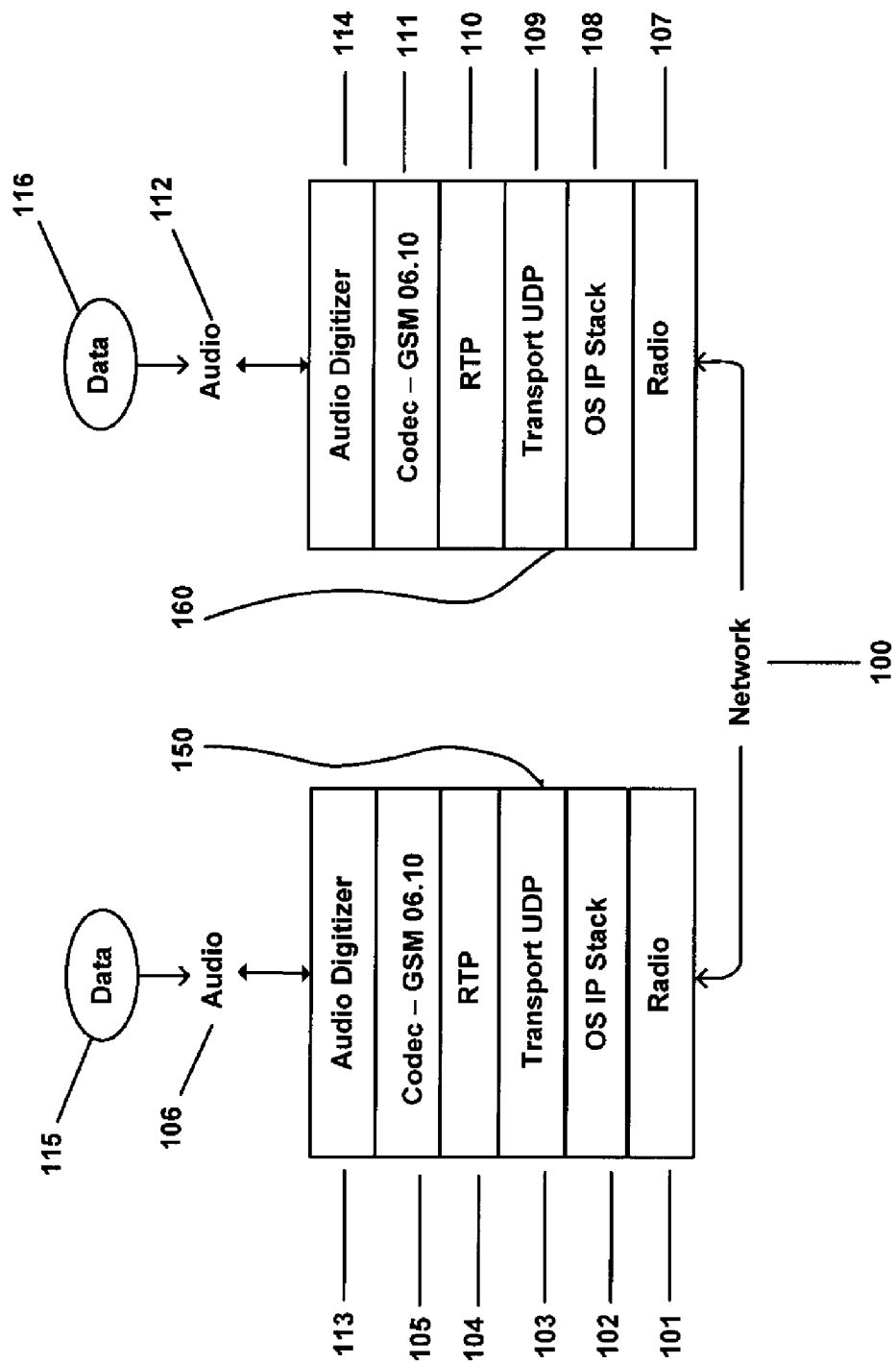
FIG. 1 is a schematic diagram depicting two VoIP SIP stacks that are known in the art.

FIG. 1 is a schematic diagram depicting a pair of prior art VoIP SIP stacks 150, 160 used for VoIP communication between two devices. Data 115, 116 (e.g., data stream) flows from an audio interface 106, 112, which can be a microphone or some other audio transmission device, through digitizers 113, 114 (e.g., audio digitizers), and then into CODECs 105, 111 to compress the data 115, 116. Once the data 115, 116 is compressed, it is passed through RTP layers 104, 110 for framing and the adding of headers.

The RTP headers provide information that helps to ensure the data 115, 116 is played back in the correct sequence. The RTP headers also allow for the handling of data 115, 116 that arrive out of order, duplicated, or completely missing. The RTP headers are useful because the underlying network protocol is typically UDP transports 103, 109. Information about RTP and UDP transmissions are described in U.S. patent application Ser. No. 11/724,153 entitled "Network Cryptography System and Method" to Fascenda et al. and filed on Mar. 15, 2007, which is incorporated herein by reference in its entirety.

After the data 115, 116 is routed through UDP transport layers 103, 109, it goes through stack layers 102, 108, and through radio layers 101, 107 before transport onto the network 100 for communication with another device or plurality of devices. The reverse steps are invoked upon reception of the data 115, 116 by the other device(s).

RTP uses a minimum of 12 bytes of header information, which is transmitted with each RTP packet. Optional header information can also be included to extend the functionality of the protocol. While the RTP header information is useful for correct interpolation of the data 115, 116, the RTP header information is not always maintained between two corresponding peer devices because of network configurations and security considerations. The relays or proxy servers of a network that relay the RTP header information may, in some instances, modify or change the entire contents of the RTP header information while transferring the data 115, 116 between the peer devices.

Because of the potential for RTP header modification by servers, encrypting data can be troublesome and unreliable. One solution is to fit the encrypted data within the bounds of the RTP payload.

Figure 2:
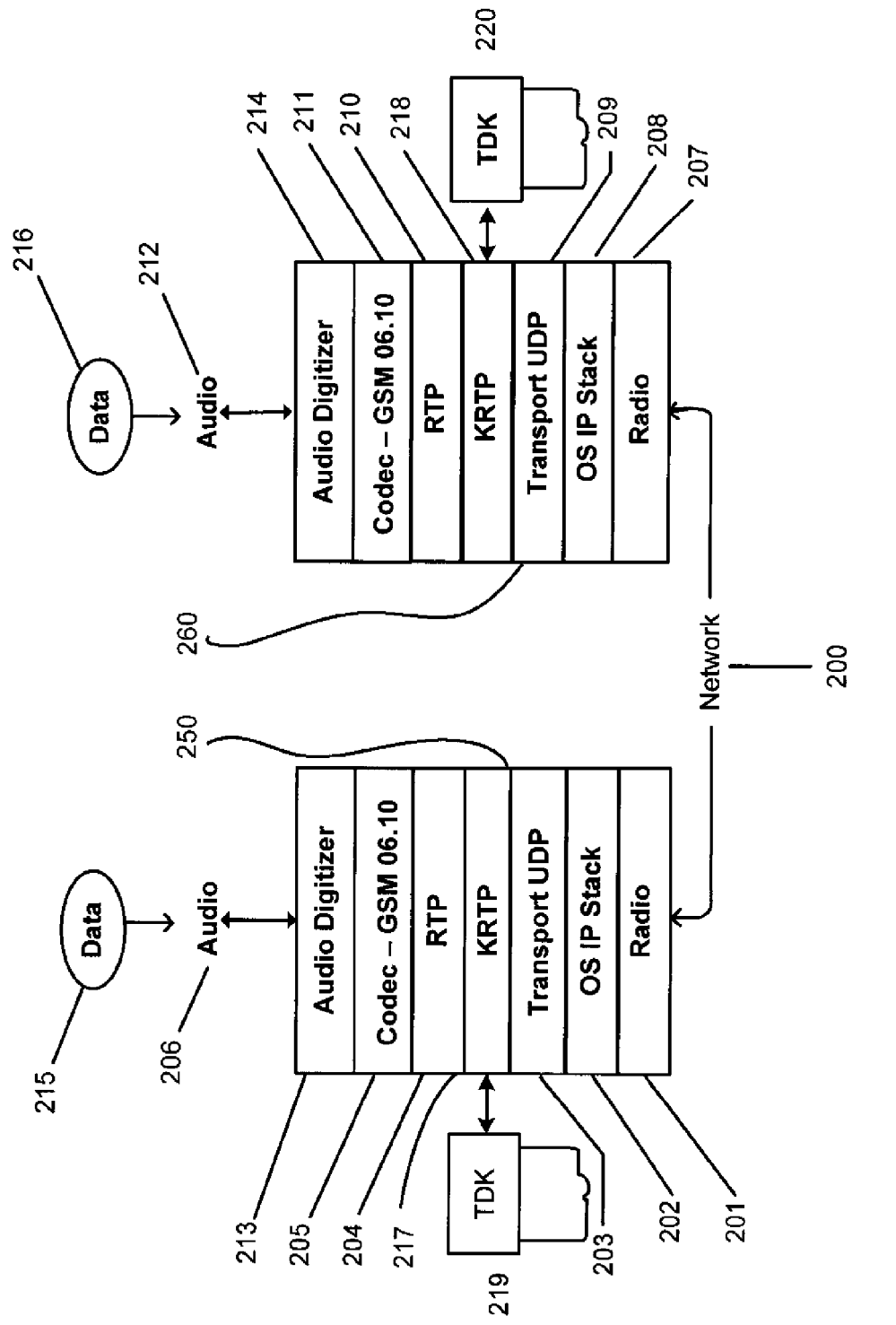
FIG. 2 is a schematic diagram depicting two VoIP SIP stacks that are modified to encrypt the RTP payload according to an embodiment of the invention.

FIG. 2 is a schematic diagram depicting two VoIP SIP stacks 250, 260 used for VoIP communications between two devices that is modified to encrypt the RTP payload according to an embodiment of the invention. Like in FIG. 1, data 215, 216 flows from an audio interface 206, 212, which can be a microphone or some other audio transmission device, through digitizers 213, 214 (e.g., audio digitizers), and then into CODECs 205, 211 to compress the data 215, 216. For example, the CODECs 205, 211 may be a coder or decoder that translates digitized data 215, 216 into compressed binary data with a defined format. The CODECs 205, 211 are defined in terms of how many bits are required for a given number of milliseconds of digitized data 215, 216 and the form of compression used to compress the digitized data 215, 216. Once the data 215, 216 is compressed, it is passed through RTP layers 204, 210 for framing and the adding of headers. Unlike FIG. 1, however, the KoolSpan RTP (KRTP) layers 217, 218 may be implemented as a filter after the RTP layers 204, 210 in VoIP stacks 250, 260 to fit the encrypted data into the RTP payload. The KRTP layers 217, 218 may ensure that the RTP payload transmitted in real-time between cooperating peer network elements remains private. Also, the KRTP layers 217, 218 may perform authentication and key negotiation via KRTP signal within the confines of a RTP session.

When un-encrypted communications are required, the KRTP layers 217, 218 act as a pass-through for the RTP information constructed at higher levels in VoIP stacks 250, 260. In one embodiment of the invention, KRTP layers 217, 218 can communicate with TrustChips 219, 220, which are capable of authenticating communications between two communicating parties as disclosed in U.S. Pat. No. 7,325,133 entitled "Mass Subscriber Management" to Fascenda and filed on Oct. 7, 2003, U.S. patent application Ser. No. 11/763,843 entitled "System and Method of Per-Packet Keying" to Fascenda et al. and filed on Jun. 15, 2007, and U.S. patent application Ser. No. 11/763,854 entitled "System and Method of Creating and Sending Broadcast and Multicast Data" to Fascenda et al. and filed on Jun. 15, 2007, which are incorporated herein by reference in their entirety.

The RTP payload containing the KRTP encrypted data is routed through UDP transports layers 203, 209. After the data 215, 216 is routed through UDP transport layers 203, 209, it goes through stack layers 202, 208, and through radio layers 201, 207 before transport onto the network 200 for communication with a device or plurality of devices. The reverse steps are invoked upon reception of the data 215, 216 by the other device(s).

One of the most significant obstacles to encryption of VoIP communications is the amount of data that must be processed and transmitted. The amount of data that will fit inside an RTP payload is related to the negotiated CODEC being used in the communication session. While FIGS. 1 and 2 depict the use of GSM 06.10 CODEC, it may be appreciated by one skilled in the art that there are many other CODECs that can be used.

The GSM 06.10 CODEC produces compressed audio samples once every 20 milliseconds with a payload size of 33 bytes per data sample. Given the rate of 20 milliseconds per data sample, that would yield 50 data samples per second to be encapsulated in RTP payload. The number of packets sent per second may be computed by taking the 33 bytes for the compressed data sample, adding 12 bytes for the minimal RTP header, adding another 8 bytes for the UDP header, and adding another 20 bytes for a standard Internet Protocol version header, e.g., Internet Protocol version 4 (IPv4) header, yielding a 73 byte data packet 50 times a second. The data rate per second may be computed by taking the 50 frames, multiplying the 73 bytes, and multiplying another 8 bits per byte, yielding a data rate of 29,200 bits per second in each direction.

In an alternative embodiment of the invention, an Internet Protocol version 6 (IPv6) header is added. An IPv6 header is larger than an IPv4 header, thus increasing the total size of the packet and requiring more bandwidth.

Figure 3:
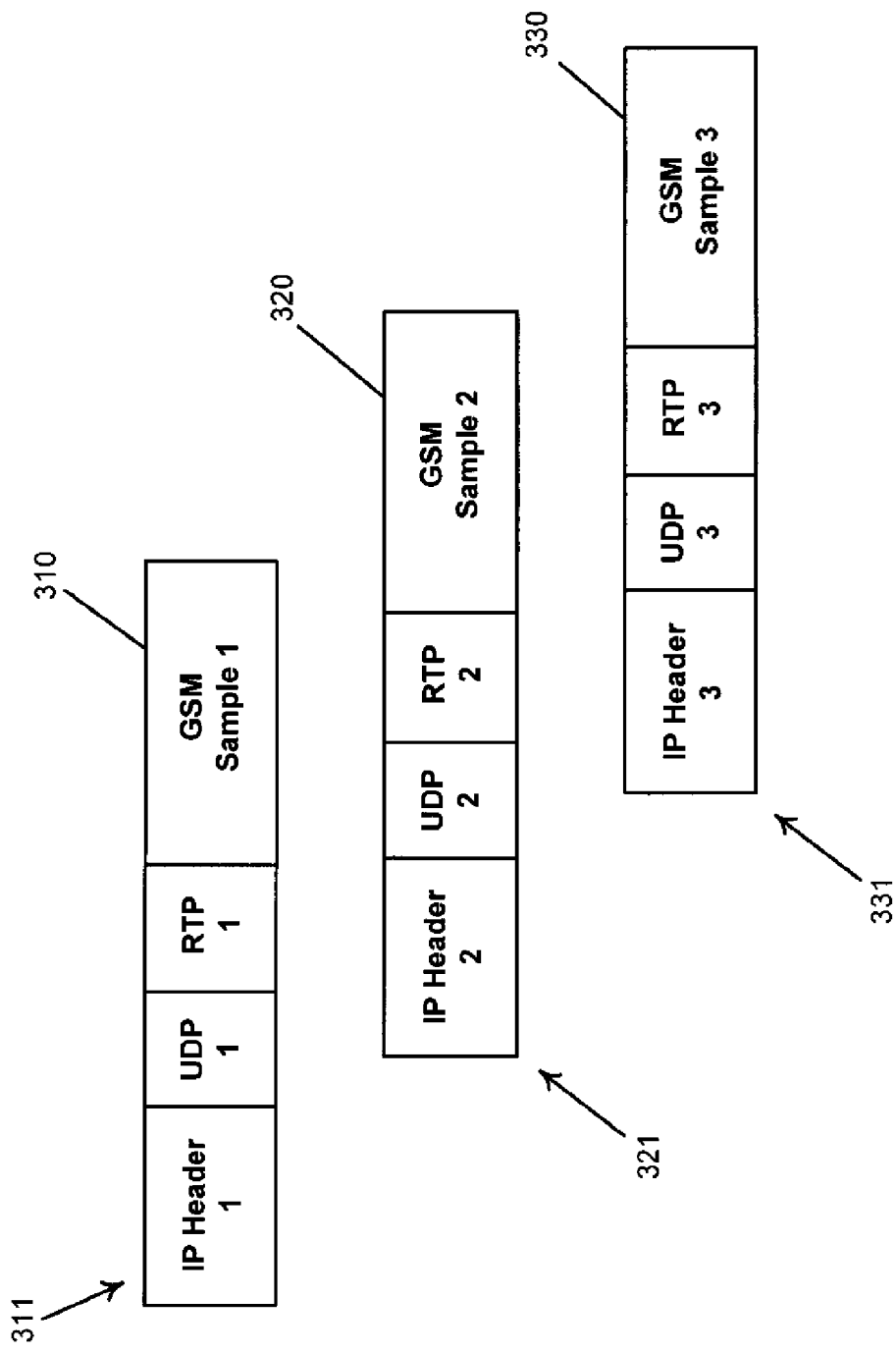
FIG. 3 is a schematic diagram depicting three typical RTP packets that are known in the art.

FIG. 3 is a schematic diagram depicting three typical RTP packets 311, 321, 331 that are known in the art. While not commonly used, each RTP packet can include one or more data samples per packet, such as another GSM 06.10 CODEC sample 310, 320, 330 as shown in FIG. 3. In one embodiment of this invention, a GSM 06.10 CODEC sample 310, 320, 330 transfers the information needed to communicate the data in secure manner.

Figure 4:
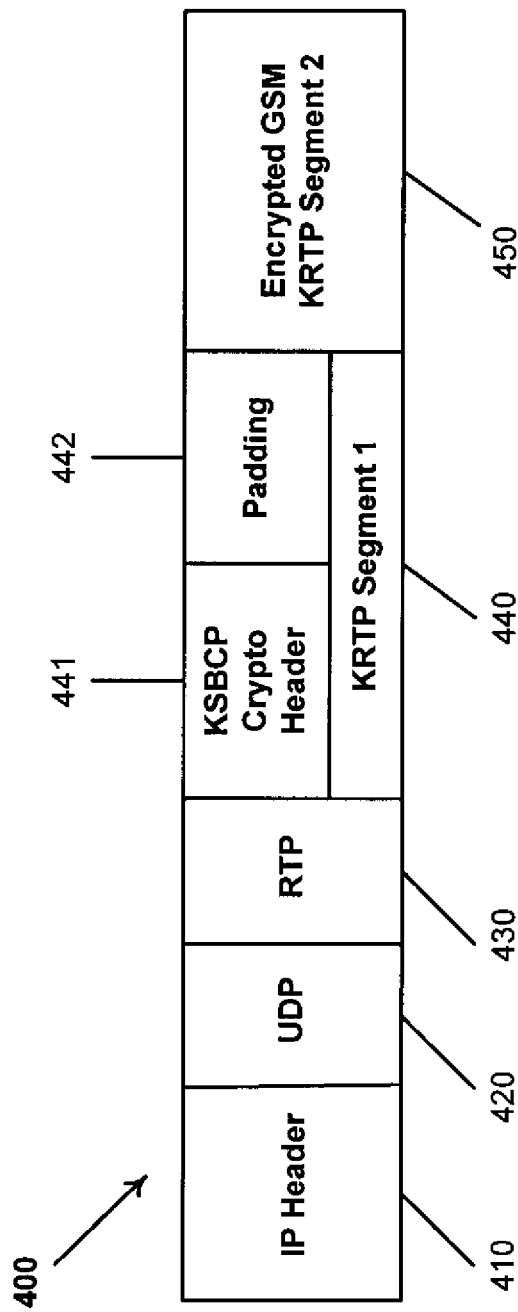
FIG. 4 is a schematic diagram depicting an encrypted KRTP packet according to an embodiment of the invention.

FIG. 4 is a schematic diagram depicting an encrypted KRTP packet 400. KRTP 440 employs KoolSpan's Secure Bilateral Communication Protocol (KSBCP) 441 to encrypt the data. The KSBCP 441 may authenticate and secure communications between two corresponding peer network elements. A KSBCP header 441 requires a minimum of 16 additional bytes of data to correctly cipher and sign a segment of data. Nevertheless, because each GSM 06.10 CODEC sample must be equal to 33 bytes, the security information must be padded with 17 additional bytes of padding 442. As shown in FIG. 4, the encrypted KRTP segment data with KSBCP security information takes the place of a GSM 06.10 CODEC sample from FIG. 3. The number of bytes per frame may be computed by taking the 33 bytes of encrypted KRTP segment data 450, adding 16 bytes of KSBCP 441, adding another 17 byte of padding 442, and adding another 40 bytes of RTP 430, UDP 420, and IP header 410, yielding 106 bytes per frame. The data rate per second for each direction may be computed by taking the 50 frames, multiplying the 106 bytes, and multiplying another 8 bits per byte, yielding a data rate of 42,400 bits per second in each direction.

While large data transmissions are capably handled by many of the newer networks available today in developed countries, these large data transmissions may exceed the capacity of some of the existing infrastructure in some of the less-developed countries, or rural and/or remote areas of the world, or where a network connection is made through the use of a wireless wide area network (WWAN). To solve this problem, KRTP employs a Packet Coalescing process whereby the KRTP builds a queue of RTP packets and encrypts the data for the queued RTP packets at one time instead of individually encrypting each individual queued RTP packets. The KRTP then transmits all the secured data in one or more larger RTP packets. By reducing the number of overall RTP packets being transmitted, the overall data rate is reduced.

Figure 5:
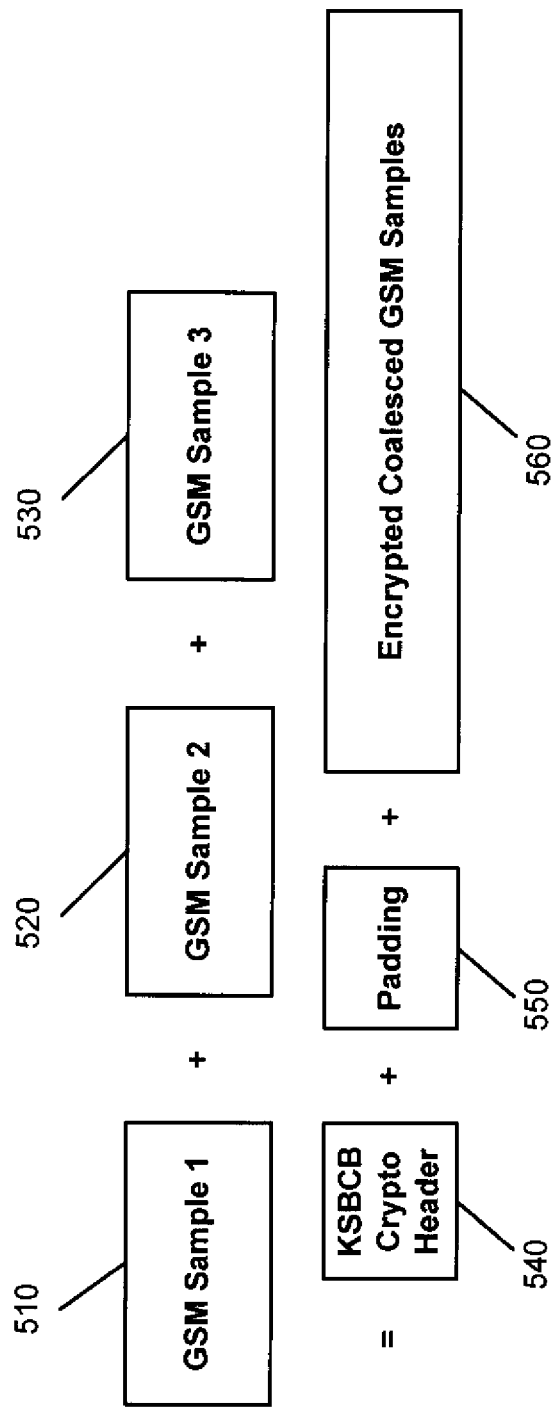
FIG. 5 is a schematic diagram depicting the encoding and combining of three GSM 06.10 CODEC samples to form a single encrypted payload according to an embodiment of the invention.

FIG. 5 is a schematic diagram depicting the encoding and combining of three GSM 06.10 CODEC samples 510, 520, 530. The three samples 510, 520, 530 are combined and added to KSBCP header 540 and padding 550 for encoding to form a single encrypted payload 560. This has the benefit of reducing the overhead—instead of sending 50 packets per second, the KRTP layer instead sends only 16.67 packets per second (50 divided by 3 yields 16.67 packets).

Figure 6:
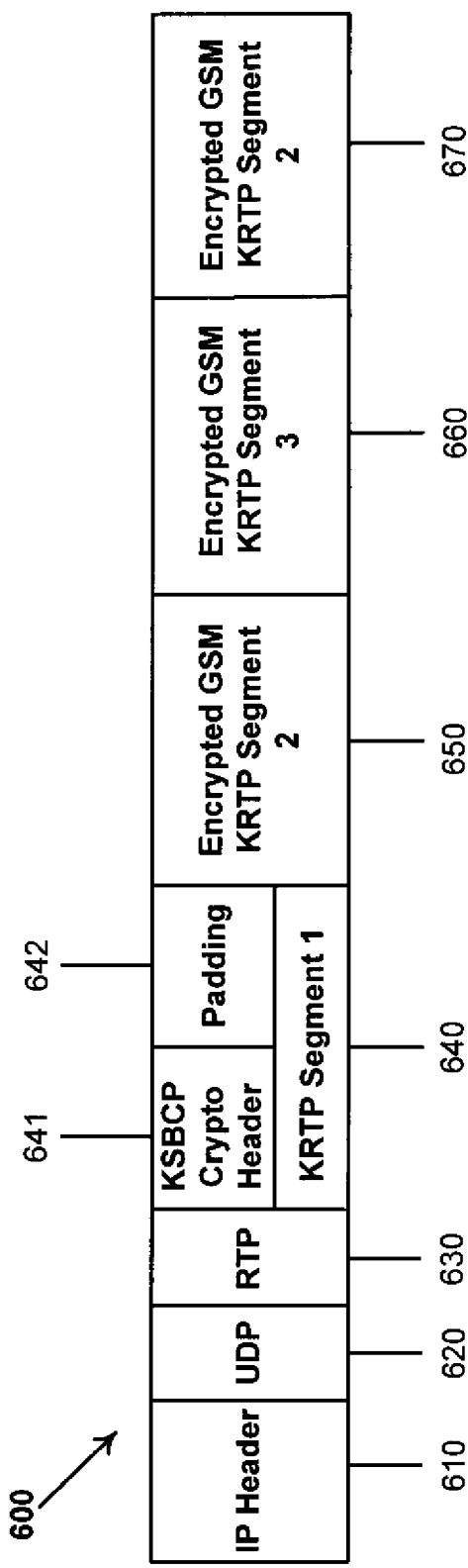
FIG. 6 is a schematic diagram depicting a single RTP packet with KSBCP security data and three encrypted KRTP payloads according to an embodiment of the invention.

FIG. 6 is a schematic diagram depicting a single packet 600 with KSBCP security data 641 and padding 642 and three encrypted KRTP samples 650, 660, 670. The IP header 610, UDP layer 620, and RTP layer 630 are added to the KRTP segment 640, which comprises KSBCP security data 641 and padding 642, and adding the three encrypted KRTP samples 650, 660, 670.

The number of bytes per packet 600 may be computed by taking the 33 bytes per sample 650, 660, 670, multiplying by three (e.g., a number of samples that are combined), adding another 16 bytes for KSBCP header 641, adding 17 bytes for padding 642, and adding 40 bytes for the RTP layer 630, the UDP layer 620, and the IP header 610, thus yielding 172 bytes per packet 600. The data rate per second (e.g., thus the overall bandwidth required for the communication network) may be computed by taking the 172 bytes, multiplying the 8 bits per byte, and multiplying the 16.67 packets per second, yielding a data rate of 22,937 bits per second in each direction. This data rate is even lower than the non-secured data rate of 29,200 bits per second.

From a network communications perspective, this single packet 600 appears to contain four RTP payload segments 640, 650, 660, 670 and is viewed by the intervening network infrastructure and relay servers as a single RTP packet 600 with 80 ms of audio data. Only by playing back the "audio" payload could an interloper determine that the data is actually encrypted. The interloper would hear the audio as static or unintelligible noise.

Figure 7:
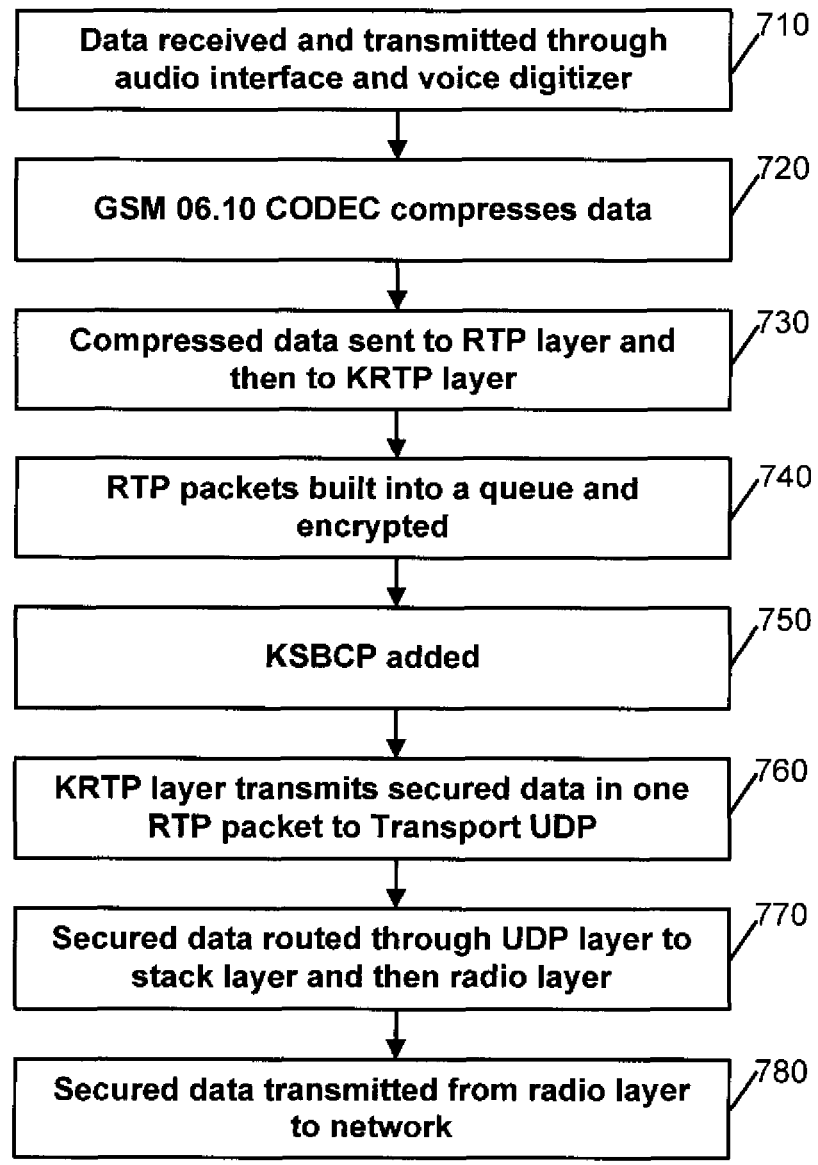
FIG. 7 is a schematic diagram depicting the steps to encapsulate an encrypted RTP payload according to an embodiment of the invention.

FIG. 7 is a schematic diagram depicting the steps to encapsulate an encrypted RTP payload according to an embodiment of the invention. As depicted in FIG. 7, data is received, transmitted through an audio interface, and then transmitted through a voice digitizer in step 710. In step 720, the data is compressed by GSM 06.10 CODEC. In step 730, the compressed data is sent to the RTP layer where it receives header information before being sent to the KRTP layer. In step 740, the RTP packets are built into a queue and, instead of individual encryption, are encrypted together. Also at the KRTP layer and as shown at step 750, the KSBCP header and padding are added. The KRTP layer then transmits the secured data in one or more large RTP packet(s) through the transport UDP layer in step 760. In step 770, the secured data is routed through the UDP layer to the stack layer and then through the radio layer. In step 780, the secured data is transmitted from the radio layer onto the network for communication with a peer device or plurality of peer devices. The reverse steps are invoked upon reception of the data by the peer device(s).

There are many advantages to the presently disclosed approach for handling multiple packets. For example, it allows a larger number of audio samples to be sent with less network overhead. It also results in reduced bandwidth requirements. The reduced bandwidth allows a VoIP application to operate in more network environments, such as WWAN areas or areas where there are less developed or capable networks. Further, it allows for the use of standard, supported protocols without modification. No modification of intervening network infrastructure or relay services is required with this technique. Publicly available services can be used without modification or support for extra standards, such as SRTP or ZRTP. The use of the technique is also difficult to detect, as the encrypted data is indistinguishable from apparently normal VoIP traffic without a deep technical evaluation.

Embodiments of the present invention may be implemented in hardware, software, firmware, or combinations thereof.

Embodiments of the present invention may also be deployed in multiple devices. For example, embodiments of the present invention may be deployed in peer-to-peer encrypted cell phone communications, such as those described in U.S. patent application Ser. No. 11/951,202 entitled "Secure Mobile Telephony" to Fascenda et al. and filed on Dec. 5, 2007.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

We claim:

1. A computer implemented method, comprising:
   receiving, via an audio digitizer, a plurality of packets of data;
   compressing, via a codec, the plurality of received packets of data;
   storing the plurality of the compressed packets of data in a memory in a queue;
   encrypting, via a Real-time Transport Protocol (RTP) layer, a plurality of payloads of the plurality of the queued compressed packets of data together into a single payload based at least in part on the compression of the plurality of packets of data; and
   transmitting the single payload in a single encrypted data packet;
   wherein the single encrypted data packet includes security information located in the single payload; and
   wherein the security information includes at least one of a KoolSpan's Secure Bilateral Communication Protocol (KSBCP) header and a padding.

2. The method of claim 1, wherein the receiving the plurality of packets of data includes:
   receiving the plurality of packets of data from an audio interface via a real-time protocol.

3. The method of claim 1, wherein each of the plurality of packets of data comprise at least one of an Internet Protocol header, an User Datagram Protocol header, a Real-Time Protocol header, and a payload.

4. The method of claim 1, wherein encrypting the plurality of payloads of the plurality of the compressed packets of data into the single payload includes:
   encrypting payloads of at least two of the plurality of the compressed packets of data together.

5. The method of claim 1, wherein the single encrypted data packet further comprises at least one of an Internet Protocol header, an User Datagram Protocol header, and a Real-Time Protocol header.

6. The method of claim 1, further comprises digitizing the plurality of packets of data.

7. The method of claim 1, wherein the plurality of packets of data are compressed by the codec using Global System for Mobile Communications (GSM) 06.10 standard.

8. The method of claim 1, wherein the RTP layer is a KoolSpan RTP (KRTP) layer, wherein the KRTP layer is an encryption filter that fits encrypted data into the RTP payloads.

9. A system, comprising:
   an audio digitizer configured to receive a plurality of packets of data;
   a codec configured to compress the plurality of received packets of data;
   an electronic memory configured to store the plurality of the compressed packets of data in a queue;
   a Real-time Transport Protocol (RTP) layer configured to encrypt, via a processor, a plurality of payloads of the plurality of the queued compressed packets of data together into a single payload based at least in part on the compression of the plurality of packets of data; and
   a radio configured to transmit the single payload in a single encrypted data packet;
   wherein the single encrypted data packet includes security information located in the single payload; and
   wherein the security information includes at least one of a KoolSpan's Secure Bilateral Communication Protocol (KSBCP) header and a padding.

10. The system of claim 9, wherein when the audio digitizer is configured to receive the plurality of packets of data, the audio digitizer is further configured to:
    receive the plurality of packets of data via a real-time protocol.

11. The system of claim 9, wherein each of the plurality of packets of data comprise at least one of an Internet Protocol header, an User Datagram Protocol header, a Real-Time Protocol header, and a payload.

12. The system of claim 9, wherein when the RTP layer is configured to encrypt the plurality of payloads of the plurality of the compressed packets of data into the single payload, the encryption filter is further configured to:
    encrypt the payloads of at least two of the plurality of the compressed packets of data.

13. The system of claim 9, wherein the single encrypted data packet further comprises at least one of an Internet Protocol header, an User Datagram Protocol header, and a Real-Time Protocol header.

14. The system of claim 9, wherein the audio digitize is further configured to digitize the plurality of packets of data.

15. The system of claim 9, wherein the codec is configured to compress the plurality of packets of data via Global System for Mobile Communications (GSM) 06.10 standard.

* * * * *